M. LACHMAN.
METHOD OF MAKING WIRE WHEELS.
APPLICATION FILED FEB. 8, 1918.
1,324,055.
Patented Dec. 9, 1919.
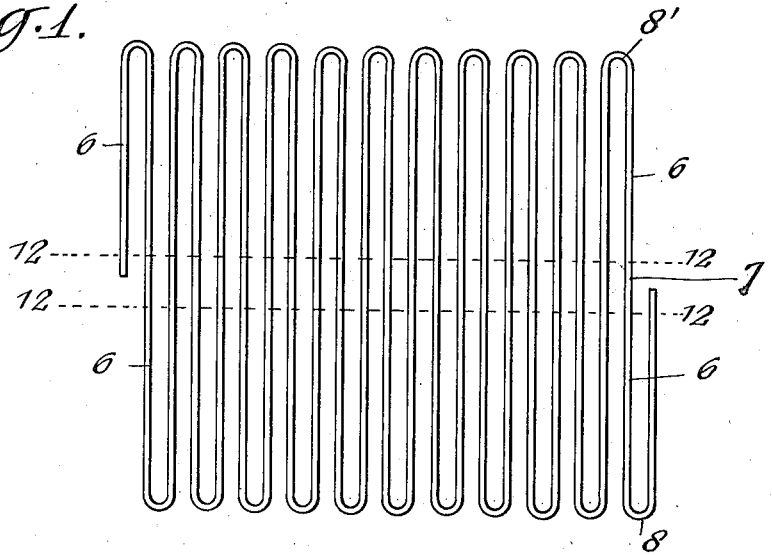
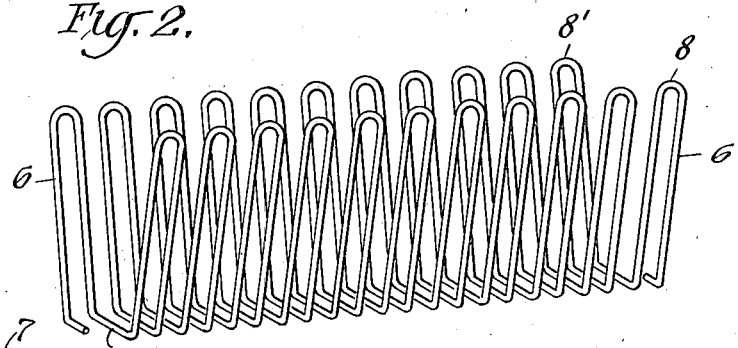
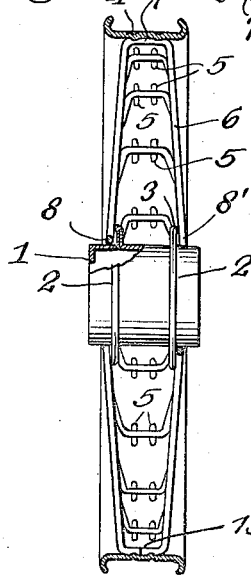
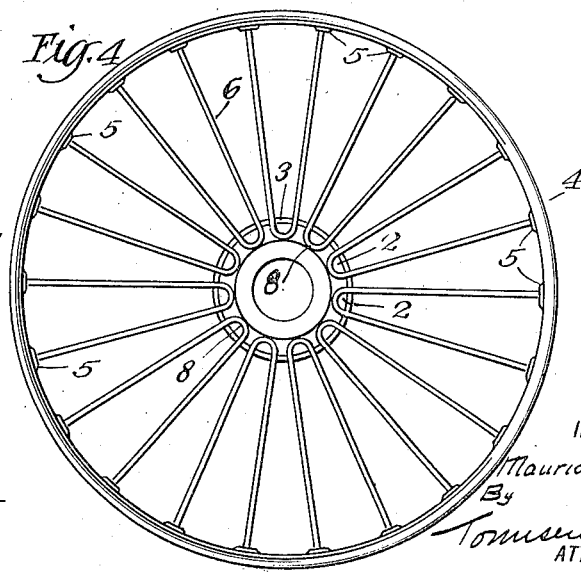
INVENTOR
Maurice Lachman
By
Townsend & Decker
ATTORNEYS

UNITED STATES PATENT OFFICE.

MAURICE LACHMAN, OF NEW YORK, N. Y., ASSIGNOR TO STRUCTURAL PRESSED STEEL WHEEL COMPANY, INC., OF NEW YORK, N. Y., A CORPORATION OF NEW YORK.

METHOD OF MAKING WIRE WHEELS.

1,324,055.  Specification of Letters Patent.  Patented Dec. 9, 1919.

Application filed February 8, 1918. Serial No. 215,982.

*To all whom it may concern:*

Be it known that I, MAURICE LACHMAN, a citizen of the United States, and a resident of New York, in the county of New York and State of New York, have invented certain new and useful Improvements in Methods of Making Wire Wheels, of which the following is a specification.

My invention relates to the manufacture of wire wheels the spoke portion of which consists of or embodies as a part thereof a continuous length of wire welded to the rim and to the hub in two different planes axially displaced with reference to one another as described and shown in my companion application filed by me February 8th, 1918, Serial No. 215,981.

My present invention relates more particularly to the manner of forming the wire portion of the wheel so as to provide the bends or loops which serve for attachment to the rim and the connecting bends or loops connecting contiguous spoke lengths at their inner ends where they are welded or secured to the hub in the different planes.

In the accompanying drawings:

Figure 1 shows diagrammatically the first stage of the operation and Fig. 2 the second stage thereof.

Fig. 3 shows a cross-section of the wheel in which the wire is embodied as the spoke portion thereof and Fig. 4 is a side elevation of said wheel.

Referring first to Fig. 3 which typifies a particular form of wheel in the construction of which my invention may be employed, 1 indicates a suitable metal hub of the wheel and 2, 2' indicate flanges thereof which are preferably provided with the circumferential side ribs or projections 3 serving to assist in the electrical welding of the side of the wire spoke portion to the hub.

4 indicates the usual metal rim provided however, by preference, with the interior circumferential ribs or projections 5 to assist in the electrical welding operation by which the wire comprising the spokes may be secured thereto. 6 indicates the wire spoke lengths united at their outer ends by loops or bends 7 transverse to the rim and electrically side welded thereto by the aid of the ribs 5 or other suitable formation of the rim.

8 8' indicate bends or loops connecting contiguous spoke lengths at their inner ends where said spokes are welded as to some of them to the side ribs 3 of flange 2 and as to others to the said ribs 3 of flange 2', the welding being either in the loop part 8 8' itself or in a portion of the spoke length contiguous thereto. The loops or bends 8 8' may rest on the barrel of the hub as shown and as described in my companion application above referred to.

As will be seen, the wire portion of the wheel is disposed to strengthen the wheel againts torsional or twisting strains. In forming up the wire portion according to my present invention I bend up, as shown in Fig. 1, a continuous length of wire into zigzag shape, the wire being disposed in one plane which may be considered as the plane of the paper and so as to provide the bends or loops 8 8' which connect contiguous spoke lengths at their inner ends where they are secured to the hub. To form the loops 7 the skeleton or zigzag is bent up transversely to the plane of the zigzag into the shape, Fig. 2, on the lines 12, 12, after which the portion comprising the loops 7 may be spread out or separated into the circular form required that it may occupy the space between the hub and rim and with a symmetrical disposition of the spokes in said space as shown in Fig. 4. Prior to the application of the bent-up wire to said space the extreme ends of the wire length used in making up the spoke portion may be welded or secured together, if desired, and as indicated at 15 Fig. 3.

What I claim as my invention is:—

1. The method of forming a continuous length of wire into the spoke portion of a wire wheel, consisting in bending the length of wire into a zigzag skeleton or frame to provide loops or bends at the hub ends of spoke lengths and then bending the zigzag frame intermediate said loops and transversely to the plane of the zigzag to form loops or bends for attachment of the outer ends of the spoke lengths to the rim.

2. The method of forming a continuous length of wire into the spoke portion of a metal wheel, consisting in bending the wire into zigzag form to produce connecting loops or bends between the inner ends of spoke lengths, bending the zigzag transversely to form loops or bends for attachment of the outer ends of the spoke lengths to the rim and spreading out the form thus produced by separating the latter loops into their spaced circumferential relation in the finished wheel.

3. The method of forming a continuous length of wire into the spoke portion of a metal wheel, consisting in bending the wire into zigzag form to produce connecting loops or bends between the inner ends of spoke lengths, bending the zigzag transversely to form loops or bends for attachment of the outer ends of the spoke lengths to the rim and spreading out the form thus produced by separating the latter loops into their spaced circumferential relation in the finished wheel and welding the ends of the wire length together.

4. The method of manufacturing wire wheels consisting in forming all the spoke members from a single length of wire by bending the wire into zigzag form and then doubling over one part with relation to the other and electrically welding the wire to both the wheel rim and the wheel hub.

Signed at New York, in the county of New York and State of New York, this 7th day of February, A. D. 1918.

MAURICE LACHMAN.

Witnesses:
F. B. TOWNSEND,
IRENE LEFKOWITZ.